US011664022B2

(12) United States Patent
Kim et al.

(10) Patent No.: US 11,664,022 B2
(45) Date of Patent: May 30, 2023

(54) METHOD FOR PROCESSING USER INPUT OF VOICE ASSISTANT

(71) Applicant: LG ELECTRONICS INC., Seoul (KR)

(72) Inventors: Hoolim Kim, Seoul (KR); Euihyeok Lee, Seoul (KR); Kihyeon Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 239 days.

(21) Appl. No.: 16/910,672

(22) Filed: Jun. 24, 2020

(65) Prior Publication Data
US 2021/0151049 A1 May 20, 2021

(30) Foreign Application Priority Data
Nov. 18, 2019 (KR) .......................... 10-2019-0147455

(51) Int. Cl.
*G10L 15/22* (2006.01)
*G10L 15/32* (2013.01)
*G10L 15/34* (2013.01)
*G10L 15/26* (2006.01)

(52) U.S. Cl.
CPC .............. *G10L 15/22* (2013.01); *G10L 15/26* (2013.01); *G10L 15/32* (2013.01); *G10L 15/34* (2013.01)

(58) Field of Classification Search
CPC ......... G10L 15/22; G10L 15/34; G10L 15/32; G10L 15/26
See application file for complete search history.

(56) References Cited

U.S. PATENT DOCUMENTS

| | | | |
|---|---|---|---|
| 10,224,035 B1* | 3/2019 | Koenig | G10L 15/22 |
| 10,832,674 B2* | 11/2020 | Jaygarl | G10L 15/26 |
| 2019/0012198 A1* | 1/2019 | Ni | G06F 3/167 |
| 2019/0189119 A1* | 6/2019 | Kondo | G10L 15/22 |
| 2019/0213490 A1* | 7/2019 | White | G06Q 10/10 |
| 2019/0370413 A1* | 12/2019 | Sehgal | G06N 5/022 |
| 2019/0378492 A1* | 12/2019 | Master | G10L 15/22 |
| 2020/0111490 A1* | 4/2020 | Jang | H04L 67/2838 |
| 2020/0342850 A1* | 10/2020 | Vishnoi | G06N 20/00 |
| 2020/0342874 A1* | 10/2020 | Teserra | G06F 40/35 |
| 2021/0026896 A1* | 1/2021 | Lecaros Easton | G06F 9/4498 |
| 2021/0090575 A1* | 3/2021 | Mahmood | G10L 17/10 |
| 2022/0020378 A1* | 1/2022 | Spiewla | H04L 67/32 |

FOREIGN PATENT DOCUMENTS

| WO | WO-2019216873 A1 * | 11/2019 | ........ G06F 16/215 |
|---|---|---|---|
| WO | WO-2019226334 A1 * | 11/2019 | ........ G06F 3/167 |

* cited by examiner

*Primary Examiner* — Brian L Albertalli
(74) *Attorney, Agent, or Firm* — Fish & Richardson P.C.

(57) ABSTRACT

Provided is a method of processing a user input to deliver the user input to at least one of a plurality of assistants, includes: converting a user input including a voice signal based on a predetermined rule to generate an instruction; splitting a complex instruction into partial instructions based on that the generated instruction is the complex instruction requesting two or more events; and determining a domain of each of the partial instructions and distributing the partial instructions to at least one of a plurality of voice assistants based on the domain. According to an embodiment, the washer may be related to artificial intelligence (AI) modules, unmanned aerial vehicles (UAVs), robots, augmented reality (AR) devices, virtual reality (VR) devices, and 5G service-related devices.

13 Claims, 12 Drawing Sheets

METHOD FOR PROCESSING USER INPUT OF VOICE ASSISTANT

CROSS-REFERENCE TO RELATED APPLICATION

This application is based on and claims priority under 35 U.S.C. 119 to Korean Patent Application No. 2019-0147455, filed on Nov. 18, 2019, in the Korean Intellectual Property Office, the disclosure of which is herein incorporated by reference in its entirety.

BACKGROUND OF THE INVENTION

Field of the Invention

The present disclosure relates to a method of processing a user input of a voice assistant.

Related Art

Devices operated under the control of users provide user interfaces through which the users may perform control operations. The user interfaces have been developed to be gradually changed from a way in which functions and operations of devices are directly controlled to a way in which such functions and operations are controlled in an intuitive manner, while requiring less physical force of users. In addition, the use of speech recognition technologies corresponding to a more intuitive and simple user input methods has increased. Since languages expressed by sound are the most natural means of communication for individuals, speech recognition-based devices have advantages of being very intuitive and easy to use.

The existing speech recognition technologies recognize a user's speech and perform a limited control operation in a specific device based on the recognized user's speech.

In recent years, with the development of artificial intelligence, a level of recognizing users' voices has been improved and voice assistants that may respond to a wider range of user commands by utilizing Internet information have also been utilized.

In order to provide a more convenient speech recognition service to users, a method capable of performing more various functions, regardless of user's input form, is required.

SUMMARY OF THE INVENTION

The present invention aims to address the foregoing issues and/or needs.

In an aspect, a method of processing a user input to deliver the user input to at least one of a plurality of assistants, includes: converting a user input including a voice signal based on a predetermined rule to generate an instruction; dividing a complex instruction into partial instructions based on that the generated instruction is the complex instruction requesting two or more events; and determining a domain of each of the partial instructions and distributing the partial instructions to at least one of a plurality of voice assistants based on the domain.

The generating of the instruction may include: extracting a user intent and attribute data from the user input; and combining the user intent to the attribute data.

The extracting of the user intent may include: extracting at least one of a target to be treated as a command and a processing method of the target from the user's input.

The extracting of the attribute data may include extracting at least one of a category of the target and an additional attribute.

The generating of the instruction may include: converting the voice signal into text; determining whether there is omitted information among the user intent and the attribute data in the text, and searching for a different type user input other than the voice signal based on the determination of the omitted information; and completing the instruction based on a user's input associated with the omitted information in the different type user input.

The dividing of the complex instruction into partial instructions may include: generating the partial instructions by matching associated user intent and attribute data.

The distributing of the partial instructions may include: classifying the domain based on the user intent of the partial instructions and searching for an assistant matched to the domain among the assistants.

The searching of the assistant matched to the domain may include: searching for an assistant having a highest weight given based on reliability or performance of the domain among a plurality of assistants based on that the plurality of assistants are matched to the domain.

The searching of the assistant matched to the domain may include: adding weights of respective domains of the partial instructions; and determining an assistant having the largest sum of the weights as a common assistant of the domain of the partial instructions.

The searching of the assistant matched to the domain may include: searching an assistant having a highest frequency use.

The distributing of the partial instructions may include: sequentially processing the complex instructions based on that the partial instructions have dependency to be treated in time series.

The distributing of the partial instructions may include: determining the presence or absence of the dependency based on the presence of an indicator indicating a user intent or attribute data of other partial instructions among the partial instructions.

The distributing of the partial instructions may include: determining a number of assistants in which the partial instructions are processed based on that there is no dependency between the partial instructions; and sequentially processing the partial instructions based on that the partial instructions are processed in one assistant and it is not possible to process the partial instructions in parallel.

The distributing of the partial instructions may include: determining whether an additional instruction is required based on that the partial instructions are processed in two or more assistants or processed in one assistant in parallel; and parallel-processing the partial instructions based on that the additional instruction is not required.

The determining of whether an additional instruction is required may include: determining a number of the additional instructions, and the partial instructions may be sequentially processed based on that two or more additional instructions are required.

The distributing of the partial instructions may include: parallel-processing the partial instructions based on that only one additional instruction is required.

The distributing of the partial instructions may include: determining an input unit of the assistant to which the partial instructions are delivered; and converting the partial instructions into a voice command based on that the input unit of the assistant is a voice signal.

DESCRIPTION OF EMBODIMENTS

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus may be used interchangeably and do not have any distinguishable meanings or functions. Further, in the following description, if a detailed description of known techniques associated with the present disclosure would unnecessarily obscure the gist of the present disclosure, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

Hereinafter, 5G communication (5th generation mobile communication) required by an apparatus requiring AI processed information and/or an AI processor will be described through paragraphs A through G.

A. Example of Block Diagram of UE and 5G Network

Figure 1:
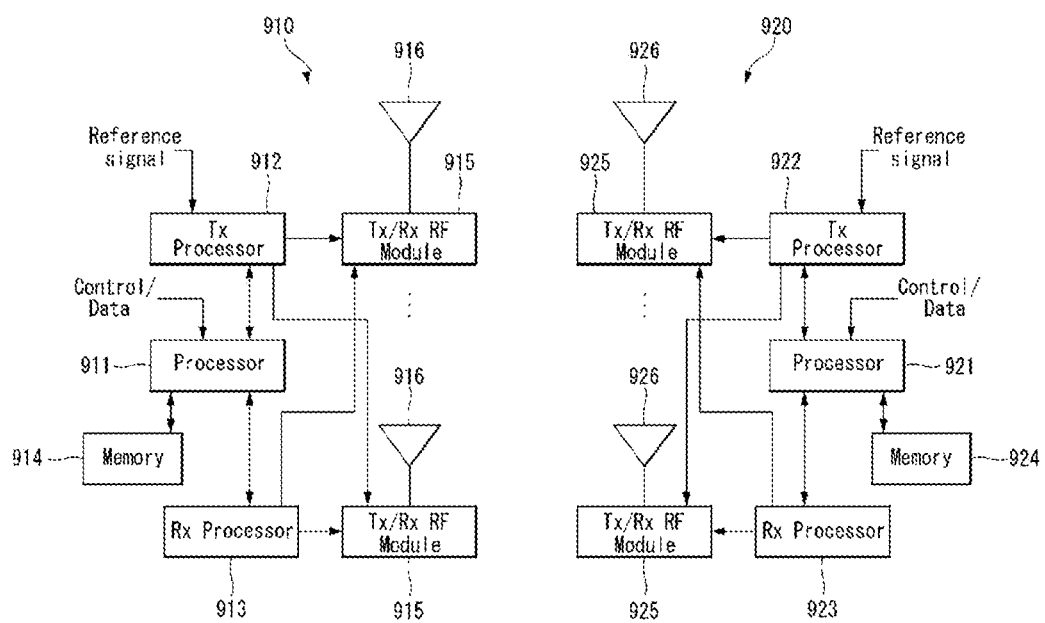
FIG. 1 is a block diagram of a wireless communication system to which methods proposed in the disclosure are applicable.

FIG. 1 is a block diagram of a wireless communication system to which methods proposed in the disclosure are applicable.

Referring to FIG. 1, a device (AI device) including an AI module is defined as a first communication device (910 of FIG. 1), and a processor 911 may perform detailed AI operation.

A 5G network including another device (AI server) communicating with the AI device is defined as a second communication device (920 of FIG. 1), and a processor 921 may perform detailed AI operations.

The 5G network may be represented as the first communication device and the AI device may be represented as the second communication device.

For example, the first communication device or the second communication device may be a base station, a network node, a transmission terminal, a reception terminal, a wireless device, a wireless communication device, an autonomous device, or the like.

For example, the first communication device or the second communication device may be a base station, a network node, a transmission terminal, a reception terminal, a wireless device, a wireless communication device, a vehicle, a vehicle having an autonomous function, a connected car, a drone (Unmanned Aerial Vehicle, UAV), and AI (Artificial Intelligence) module, a robot, an AR (Augmented Reality) device, a VR (Virtual Reality) device, an MR (Mixed Reality) device, a hologram device, a public safety device, an MTC device, an IoT device, a medical device, a Fin Tech device (or financial device), a security device, a climate/environment device, a device associated with 5G services, or other devices associated with the fourth industrial revolution field.

For example, a terminal or user equipment (UE) may include a cellular phone, a smart phone, a laptop computer, a digital broadcast terminal, personal digital assistants (PDAs), a portable multimedia player (PMP), a navigation device, a slate PC, a tablet PC, an ultrabook, a wearable device (e.g., a smartwatch, a smart glass and a head mounted display (HMD)), etc. For example, the HMD may be a display device worn on the head of a user. For example, the HMD may be used to realize VR, AR or MR. For example, the drone may be a flying object that flies by wireless control signals without a person therein. For example, the VR device may include a device that implements objects or backgrounds of a virtual world. For example, the AR device may include a device that connects and implements objects or background of a virtual world to objects, backgrounds, or the like of a real world. For example, the MR device may include a device that unites and implements objects or background of a virtual world to objects, backgrounds, or the like of a real world. For example, the hologram device may include a device that implements 360-degree 3D images by recording and playing 3D information using the interference phenomenon of light that is generated by two lasers meeting each other which is called holography. For example, the public safety device may include an image repeater or an imaging device that may be worn on the body of a user. For example, the MTC device and the IoT device may be devices that do not require direct interference or operation by a person. For example, the MTC device and the IoT device may include a smart meter, a bending machine, a thermometer, a smart bulb, a door lock, various sensors, or the like. For example, the medical device may be a device that is used to diagnose, treat, attenuate, remove, or prevent diseases. For example, the medical device may be a device that is used to diagnose, treat, attenuate, or correct injuries or disorders. For example, the medial device may be a device that is used to examine, replace, or change structures or functions. For example, the medical device may be a device that is used to control pregnancy. For example, the medical device may include a device for medical treatment, a device for operations, a device for (external) diagnose, a hearing aid, an operation device, or the like. For example, the security device may be a device that is installed to prevent a danger that is likely to occur and to keep safety. For example, the security device may be a camera, a CCTV, a recorder, a black box, or the like. For example, the Fin Tech device may be a device that may provide financial services such as mobile payment.

Referring to FIG. 1, the first communication device 910 and the second communication device 920 include processors 911 and 921, memories 914 and 924, one or more Tx/Rx radio frequency (RF) modules 915 and 925, Tx processors 912 and 922, Rx processors 913 and 923, and antennas 916 and 926. The Tx/Rx module is also referred to as a transceiver. Each Tx/Rx module 915 transmits a signal through each antenna 926. The processor implements the aforementioned functions, processes and/or methods. The processor 921 may be related to the memory 924 that stores program code and data. The memory may be referred to as a computer-readable medium. More specifically, the Tx processor 912 implements various signal processing functions with respect to L1 (i.e., physical layer) in DL (communication from the first communication device to the second communication device). The Rx processor implements various signal processing functions of L1 (i.e., physical layer).

UL (communication from the second communication device to the first communication device) is processed in the first communication device 910 in a way similar to that described in association with a receiver function in the second communication device 920. Each Tx/Rx module 925 receives a signal through each antenna 926. Each Tx/Rx module provides RF carriers and information to the Rx processor 923. The processor 921 may be related to the memory 924 that stores program code and data. The memory may be referred to as a computer-readable medium.

B. Signal Transmission/Reception Method in Wireless Communication System

Figure 2:
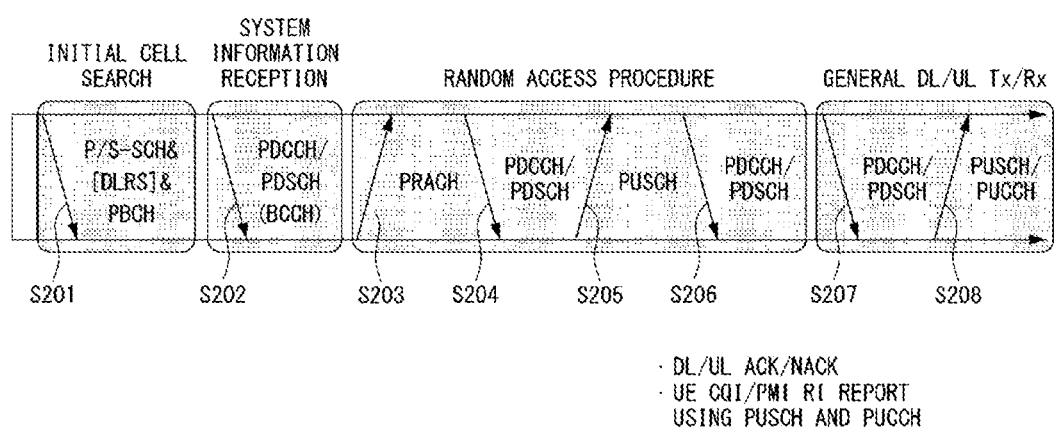
FIG. 2 shows an example of a signal transmission/reception method in a wireless communication system.

FIG. 2 is a diagram showing an example of a signal transmission/reception method in a wireless communication system.

Referring to FIG. 2, when a UE is powered on or enters a new cell, the UE performs an initial cell search operation such as synchronization with a BS (S201). For this operation, the UE may receive a primary synchronization channel (P-SCH) and a secondary synchronization channel (S-SCH) from the BS to synchronize with the BS and acquire information such as a cell ID. In LTE and NR systems, the P-SCH and S-SCH are respectively called a primary synchronization signal (PSS) and a secondary synchronization signal (SSS). After initial cell search, the UE may acquire broadcast information in the cell by receiving a physical broadcast channel (PBCH) from the BS. Further, the UE may receive a downlink reference signal (DL RS) in the initial cell search step to check a downlink channel state. After initial cell search, the UE may acquire more detailed system information by receiving a physical downlink shared channel (PDSCH) according to a physical downlink control channel (PDCCH) and information included in the PDCCH (S202).

Meanwhile, when the UE initially accesses the BS or has no radio resource for signal transmission, the UE may perform a random access procedure (RACH) for the BS (steps S203 to S206). To this end, the UE may transmit a specific sequence as a preamble through a physical random access channel (PRACH) (S203 and S205) and receive a random access response (RAR) message for the preamble through a PDCCH and a corresponding PDSCH (S204 and S206). In the case of a contention-based RACH, a contention resolution procedure may be additionally performed.

After the UE performs the above-described process, the UE may perform PDCCH/PDSCH reception (S207) and physical uplink shared channel (PUSCH)/physical uplink control channel (PUCCH) transmission (S208) as normal uplink/downlink signal transmission processes. Particularly, the UE receives downlink control information (DCI) through the PDCCH. The UE monitors a set of PDCCH candidates in monitoring occasions set for one or more control element sets (CORESET) on a serving cell according to corresponding search space configurations. A set of PDCCH candidates to be monitored by the UE is defined in terms of search space sets, and a search space set may be a common search space set or a UE-specific search space set. CORESET includes a set of (physical) resource blocks having a duration of one to three OFDM symbols. A network may configure the UE such that the UE has a plurality of CORESETs. The UE monitors PDCCH candidates in one or more search space sets. Here, monitoring means attempting decoding of PDCCH candidate(s) in a search space. When the UE has successfully decoded one of PDCCH candidates in a search space, the UE determines that a PDCCH has been detected from the PDCCH candidate and performs PDSCH reception or PUSCH transmission on the basis of DCI in the detected PDCCH. The PDCCH may be used to schedule DL transmissions over a PDSCH and UL transmissions over a PUSCH. Here, the DCI in the PDCCH includes downlink assignment (i.e., downlink grant (DL grant)) related to a physical downlink shared channel and including at least a modulation and coding format and resource allocation information, or an uplink grant (UL grant) related to a physical uplink shared channel and including a modulation and coding format and resource allocation information.

An initial access (IA) procedure in a 5G communication system will be additionally described with reference to FIG. 2.

The UE may perform cell search, system information acquisition, beam alignment for initial access, and DL measurement on the basis of an SSB. The SSB is interchangeably used with a synchronization signal/physical broadcast channel (SS/PBCH) block.

The SSB includes a PSS, an SSS and a PBCH. The SSB is configured in four consecutive OFDM symbols, and a PSS, a PBCH, an SSS/PBCH or a PBCH is transmitted for each OFDM symbol. Each of the PSS and the SSS includes one OFDM symbol and 127 subcarriers, and the PBCH includes 3 OFDM symbols and 576 subcarriers.

Cell search refers to a process in which a UE acquires time/frequency synchronization of a cell and detects a cell identifier (ID) (e.g., physical layer cell ID (PCI)) of the cell. The PSS is used to detect a cell ID in a cell ID group and the SSS is used to detect a cell ID group. The PBCH is used to detect an SSB (time) index and a half-frame.

There are 336 cell ID groups and there are 3 cell IDs per cell ID group. A total of 1008 cell IDs are present. Information on a cell ID group to which a cell ID of a cell belongs is provided/acquired through an SSS of the cell, and information on the cell ID among 336 cell ID groups is provided/acquired through a PSS.

The SSB is periodically transmitted in accordance with SSB periodicity. A default SSB periodicity assumed by a UE during initial cell search is defined as 20 ms. After cell access, the SSB periodicity may be set to one of {5 ms, 10 ms, 20 ms, 40 ms, 80 ms, 160 ms} by a network (e.g., a BS).

Next, acquisition of system information (SI) will be described.

SI is divided into a master information block (MIB) and a plurality of system information blocks (SIBs). SI other than the MIB may be referred to as remaining minimum system information. The MIB includes information/parameter for monitoring a PDCCH that schedules a PDSCH carrying SIB1 (SystemInformationBlock1) and is transmitted by a BS through a PBCH of an SSB. SIB1 includes information related to availability and scheduling (e.g., transmission periodicity and SI-window size) of the remaining SIBs (hereinafter, SIBx, x is an integer equal to or greater than 2). SiBx is included in an SI message and transmitted over a PDSCH. Each SI message is transmitted within a periodically generated time window (i.e., SI-window).

A random access (RA) procedure in a 5G communication system will be additionally described with reference to FIG. 2.

A random access procedure is used for various purposes. For example, the random access procedure may be used for network initial access, handover, and UE-triggered UL data transmission. A UE may acquire UL synchronization and UL transmission resources through the random access procedure. The random access procedure is classified into a contention-based random access procedure and a contention-free random access procedure. A detailed procedure for the contention-based random access procedure is as follows.

A UE may transmit a random access preamble through a PRACH as Msg1 of a random access procedure in UL. Random access preamble sequences having different two lengths are supported. A long sequence length 839 is applied to subcarrier spacings of 1.25 kHz and 5 kHz and a short sequence length 139 is applied to subcarrier spacings of 15 kHz, 30 kHz, 60 kHz and 120 kHz.

When a BS receives the random access preamble from the UE, the BS transmits a random access response (RAR) message (Msg2) to the UE. A PDCCH that schedules a PDSCH carrying a RAR is CRC masked by a random access (RA) radio network temporary identifier (RNTI) (RA-RNTI) and transmitted. Upon detection of the PDCCH masked by the RA-RNTI, the UE may receive a RAR from the PDSCH scheduled by DCI carried by the PDCCH. The UE checks whether the RAR includes random access response information with respect to the preamble transmitted by the UE, that is, Msg1. Presence or absence of random access information with respect to Msg1 transmitted by the UE may be determined according to presence or absence of a random access preamble ID with respect to the preamble transmitted by the UE. If there is no response to Msg1, the UE may retransmit the RACH preamble less than a predetermined number of times while performing power ramping. The UE calculates PRACH transmission power for preamble retransmission on the basis of most recent pathloss and a power ramping counter.

The UE may perform UL transmission through Msg3 of the random access procedure over a physical uplink shared channel on the basis of the random access response information. Msg3 may include an RRC connection request and a UE ID. The network may transmit Msg4 as a response to Msg3, and Msg4 may be handled as a contention resolution message on DL. The UE may enter an RRC connected state by receiving Msg4.

C. Beam Management (BM) Procedure of 5G Communication System

A BM procedure may be divided into (1) a DL MB procedure using an SSB or a CSI-RS and (2) a UL BM procedure using a sounding reference signal (SRS). In addition, each BM procedure may include Tx beam swiping for determining a Tx beam and Rx beam swiping for determining an Rx beam.

The DL BM procedure using an SSB will be described.

Configuration of a beam report using an SSB is performed when channel state information (CSI)/beam is configured in RRC_CONNECTED.

- A UE receives a CSI-ResourceConfig IE including CSI-SSB-ResourceSetList for SSB resources used for BM from a BS. The RRC parameter "csi-SSB-ResourceSetList" represents a list of SSB resources used for beam management and report in one resource set. Here, an SSB resource set may be set as {SSBx1, SSBx2, SSBx3, SSBx4, . . . }. An SSB index may be defined in the range of 0 to 63.
- The UE receives the signals on SSB resources from the BS on the basis of the CSI-SSB-ResourceSetList.
- When CSI-RS reportConfig with respect to a report on SSBRI and reference signal received power (RSRP) is set, the UE reports the best SSBRI and RSRP corresponding thereto to the BS. For example, when reportQuantity of the CSI-RS reportConfig IE is set to 'ssb-Index-RSRP', the UE reports the best SSBRI and RSRP corresponding thereto to the BS.

When a CSI-RS resource is configured in the same OFDM symbols as an SSB and 'QCL-TypeD' is applicable, the UE may assume that the CSI-RS and the SSB are quasi co-located (QCL) from the viewpoint of 'QCL-TypeD'. Here, QCL-TypeD may mean that antenna ports are quasi co-located from the viewpoint of a spatial Rx parameter. When the UE receives signals of a plurality of DL antenna ports in a QCL-TypeD relationship, the same Rx beam may be applied.

Next, a DL BM procedure using a CSI-RS will be described.

An Rx beam determination (or refinement) procedure of a UE and a Tx beam swiping procedure of a BS using a CSI-RS will be sequentially described. A repetition parameter is set to 'ON' in the Rx beam determination procedure of a UE and set to 'OFF' in the Tx beam swiping procedure of a BS.

First, the Rx beam determination procedure of a UE will be described.

- The UE receives an NZP CSI-RS resource set IE including an RRC parameter with respect to 'repetition' from a BS through RRC signaling. Here, the RRC parameter 'repetition' is set to 'ON'.
- The UE repeatedly receives signals on resources in a CSI-RS resource set in which the RRC parameter 'repetition' is set to 'ON' in different OFDM symbols through the same Tx beam (or DL spatial domain transmission filters) of the BS.

The UE determines an RX beam thereof

The UE skips a CSI report. That is, the UE may skip a CSI report when the RRC parameter 'repetition' is set to 'ON'.

Next, the Tx beam determination procedure of a BS will be described.

A UE receives an NZP CSI-RS resource set IE including an RRC parameter with respect to 'repetition' from the BS through RRC signaling. Here, the RRC parameter 'repetition' is related to the Tx beam swiping procedure of the BS when set to 'OFF'.

The UE receives signals on resources in a CSI-RS resource set in which the RRC parameter 'repetition' is set to 'OFF' in different DL spatial domain transmission filters of the BS.

The UE selects (or determines) a best beam.

The UE reports an ID (e.g., CRI) of the selected beam and related quality information (e.g., RSRP) to the BS. That is, when a CSI-RS is transmitted for BM, the UE reports a CRI and RSRP with respect thereto to the BS.

Next, the UL BM procedure using an SRS will be described.

A UE receives RRC signaling (e.g., SRS-Config IE) including a (RRC parameter) purpose parameter set to 'beam management" from a BS. The SRS-Config IE is used to set SRS transmission. The SRS-Config IE includes a list of SRS-Resources and a list of SRS-ResourceSets. Each SRS resource set refers to a set of SRS-resources.

The UE determines Tx beamforming for SRS resources to be transmitted on the basis of SRS-SpatialRelation Info included in the SRS-Config IE. Here, SRS-SpatialRelation Info is set for each SRS resource and indicates whether the same beamforming as that used for an SSB, a CSI-RS or an SRS will be applied for each SRS resource.

When SRS-SpatialRelationInfo is set for SRS resources, the same beamforming as that used for the SSB, CSI-RS or SRS is applied. However, when SRS-SpatialRelationInfo is not set for SRS resources, the UE arbitrarily determines Tx beamforming and transmits an SRS through the determined Tx beamforming.

Next, a beam failure recovery (BFR) procedure will be described.

In a beamformed system, radio link failure (RLF) may frequently occur due to rotation, movement or beamforming blockage of a UE. Accordingly, NR supports BFR in order to prevent frequent occurrence of RLF. BFR is similar to a radio link failure recovery procedure and may be supported when a UE knows new candidate beams. For beam failure detection, a BS configures beam failure detection reference signals for a UE, and the UE declares beam failure when the number of beam failure indications from the physical layer of the UE reaches a threshold set through RRC signaling within a period set through RRC signaling of the BS. After beam failure detection, the UE triggers beam failure recovery by initiating a random access procedure in a PCell and performs beam failure recovery by selecting a suitable beam. (When the BS provides dedicated random access resources for certain beams, these are prioritized by the UE). Completion of the aforementioned random access procedure is regarded as completion of beam failure recovery.

D. URLLC (Ultra-Reliable and Low Latency Communication)

URLLC transmission defined in NR may refer to (1) a relatively low traffic size, (2) a relatively low arrival rate, (3) extremely low latency requirements (e.g., 0.5 and 1 ms), (4) relatively short transmission duration (e.g., 2 OFDM symbols), (5) urgent services/messages, etc. In the case of UL, transmission of traffic of a specific type (e.g., URLLC) needs to be multiplexed with another transmission (e.g., eMBB) scheduled in advance in order to satisfy more stringent latency requirements. In this regard, a method of providing information indicating preemption of specific resources to a UE scheduled in advance and allowing a URLLC UE to use the resources for UL transmission is provided.

NR supports dynamic resource sharing between eMBB and URLLC. eMBB and URLLC services may be scheduled on non-overlapping time/frequency resources, and URLLC transmission may occur in resources scheduled for ongoing eMBB traffic. An eMBB UE may not ascertain whether PDSCH transmission of the corresponding UE has been partially punctured and the UE may not decode a PDSCH due to corrupted coded bits. In view of this, NR provides a preemption indication. The preemption indication may also be referred to as an interrupted transmission indication.

With regard to the preemption indication, a UE receives DownlinkPreemption IE through RRC signaling from a BS. When the UE is provided with DownlinkPreemption IE, the UE is configured with INT-RNTI provided by a parameter int-RNTI in DownlinkPreemption IE for monitoring of a PDCCH that conveys DCI format 2_1. The UE is additionally configured with a corresponding set of positions for fields in DCI format 2_1 according to a set of serving cells and positionInDCI by INT-ConfigurationPerServing Cell including a set of serving cell indexes provided by serving-CellID, configured having an information payload size for DCI format 2_1 according to dci-Payloadsize, and configured with indication granularity of time-frequency resources according to timeFrequencySect.

The UE receives DCI format 2_1 from the BS on the basis of the DownlinkPreemption IE.

When the UE detects DCI format 2_1 for a serving cell in a configured set of serving cells, the UE may assume that there is no transmission to the UE in PRBs and symbols indicated by the DCI format 2_1 in a set of PRBs and a set of symbols in a last monitoring period before a monitoring period to which the DCI format 2_1 belongs. For example, the UE assumes that a signal in a time-frequency resource indicated according to preemption is not DL transmission scheduled therefor and decodes data on the basis of signals received in the remaining resource region.

E. MMTC (massive MTC)

mMTC (massive Machine Type Communication) is one of 5G scenarios for supporting a hyper-connection service providing simultaneous communication with a large number of UEs. In this environment, a UE intermittently performs communication with a very low speed and mobility. Accordingly, a main goal of mMTC is operating a UE for a long time at a low cost. With respect to mMTC, 3GPP deals with MTC and NB (NarrowBand)-IoT.

mMTC has features such as repetitive transmission of a PDCCH, a PUCCH, a PDSCH (physical downlink shared channel), a PUSCH, etc., frequency hopping, retuning, and a guard period.

That is, a PUSCH (or a PUCCH (particularly, a long PUCCH) or a PRACH) including specific information and a PDSCH (or a PDCCH) including a response to the specific information are repeatedly transmitted. Repetitive transmission is performed through frequency hopping, and for repetitive transmission, (RF) retuning from a first frequency resource to a second frequency resource is performed in a guard period and the specific information and the response to the specific information may be transmitted/received through a narrowband (e.g., 6 resource blocks (RBs) or 1 RB).

F. Basic Operation Between Autonomous Vehicles Using 5G Communication

Figure 3:
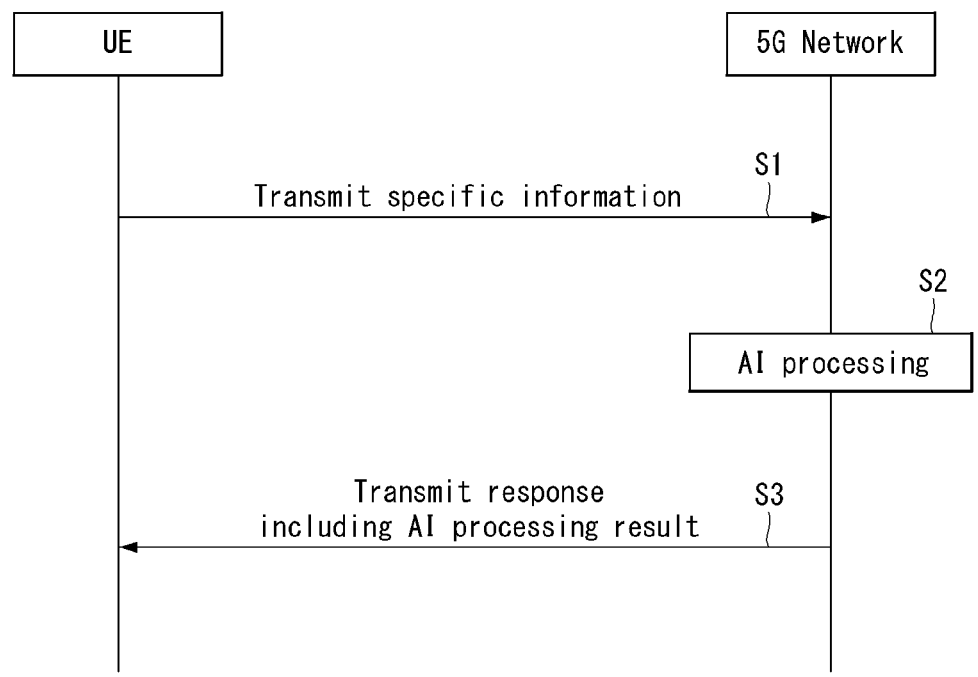
FIG. 3 shows an example of basic operations of an user equipment and a 5G network in a 5G communication system.

FIG. 3 shows an example of basic operations of an autonomous vehicle and a 5G network in a 5G communication system.

The autonomous vehicle transmits specific information to the 5G network (S1). The specific information may include autonomous driving related information. In addition, the 5G network may determine whether to remotely control the vehicle (S2). Here, the 5G network may include a server or a module which performs remote control related to autonomous driving. In addition, the 5G network may transmit information (or signal) related to remote control to the autonomous vehicle (S3).

G. Applied Operations Between Autonomous Vehicle and 5G Network in 5G Communication System Hereinafter, the operation of an autonomous vehicle using 5G communication will be described in more detail with reference to wireless communication technology (BM procedure, URLLC, mMTC, etc.) described in FIGS. 1 and 2.

First, a basic procedure of an applied operation to which a method proposed by the present disclosure which will be described later and eMBB of 5G communication are applied will be described.

As in steps S1 and S3 of FIG. 3, the autonomous vehicle performs an initial access procedure and a random access procedure with the 5G network prior to step S1 of FIG. 3 in order to transmit/receive signals, information and the like to/from the 5G network.

More specifically, the autonomous vehicle performs an initial access procedure with the 5G network on the basis of an SSB in order to acquire DL synchronization and system information. A beam management (BM) procedure and a beam failure recovery procedure may be added in the initial access procedure, and quasi-co-location (QCL) relation may be added in a process in which the autonomous vehicle receives a signal from the 5G network.

In addition, the autonomous vehicle performs a random access procedure with the 5G network for UL synchronization acquisition and/or UL transmission. The 5G network may transmit, to the autonomous vehicle, a UL grant for scheduling transmission of specific information. Accordingly, the autonomous vehicle transmits the specific information to the 5G network on the basis of the UL grant. In addition, the 5G network transmits, to the autonomous vehicle, a DL grant for scheduling transmission of 5G processing results with respect to the specific information. Accordingly, the 5G network may transmit, to the autonomous vehicle, information (or a signal) related to remote control on the basis of the DL grant.

Next, a basic procedure of an applied operation to which a method proposed by the present disclosure which will be described later and URLLC of 5G communication are applied will be described.

As described above, an autonomous vehicle may receive DownlinkPreemption IE from the 5G network after the autonomous vehicle performs an initial access procedure and/or a random access procedure with the 5G network. Then, the autonomous vehicle receives DCI format 2_1 including a preemption indication from the 5G network on the basis of DownlinkPreemption IE. The autonomous vehicle does not perform (or expect or assume) reception of eMBB data in resources (PRBs and/or OFDM symbols) indicated by the preemption indication. Thereafter, when the autonomous vehicle needs to transmit specific information, the autonomous vehicle may receive a UL grant from the 5G network.

Next, a basic procedure of an applied operation to which a method proposed by the present disclosure which will be described later and mMTC of 5G communication are applied will be described.

Description will focus on parts in the steps of FIG. 3 which are changed according to application of mMTC.

In step S1 of FIG. 3, the autonomous vehicle receives a UL grant from the 5G network in order to transmit specific information to the 5G network. Here, the UL grant may include information on the number of repetitions of transmission of the specific information and the specific information may be repeatedly transmitted on the basis of the information on the number of repetitions. That is, the autonomous vehicle transmits the specific information to the 5G network on the basis of the UL grant. Repetitive transmission of the specific information may be performed through frequency hopping, the first transmission of the specific information may be performed in a first frequency resource, and the second transmission of the specific information may be performed in a second frequency resource. The specific information may be transmitted through a narrowband of 6 resource blocks (RBs) or 1 RB.

The above-described 5G communication technology may be combined with methods proposed in the present disclosure which will be described later and applied or may complement the methods proposed in the present disclosure to make technical features of the methods concrete and clear.

Figure 4:
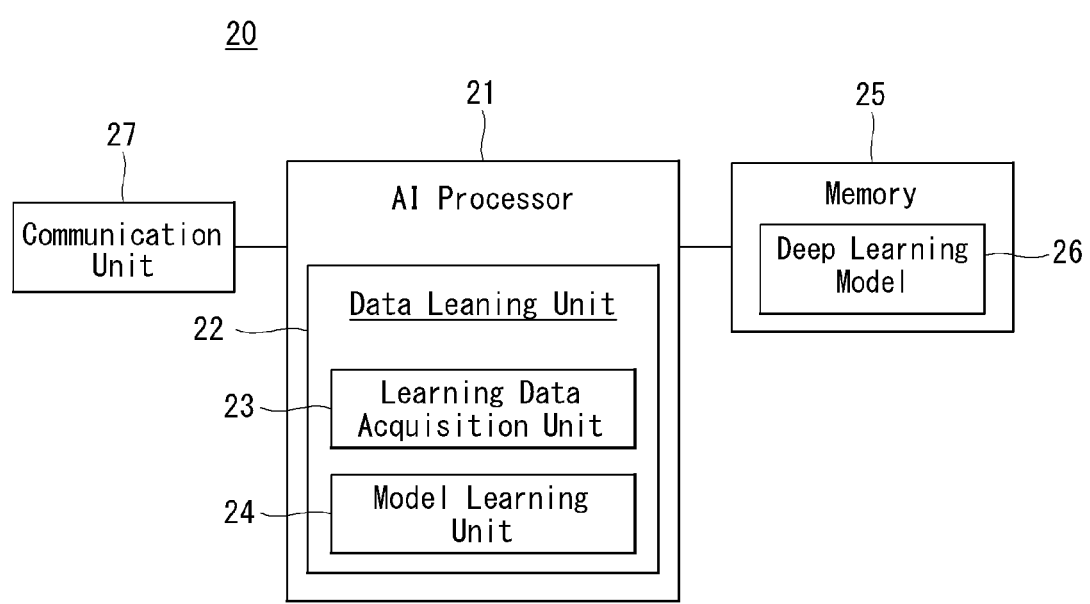
FIG. 4 is a block diagram of an AI device according to an embodiment of the present disclosure.

FIG. 4 is a block diagram illustrating an AI device according to an embodiment of the present disclosure.

Referring to FIG. 4, an AI device 20 may include an electronic device including an AI module capable of AI processing or a server including an AI module. The AI device 20 may be included as at least a component of the washer 10 of FIGS. 4 and 5 so that the AI device 20 may perform at least part of AI processing along therewith.

AI processing may include all operations related to the controller 100 of the washer 10 of FIG. 4. For example, the washer 10 perform AI processing the laundry image or laundry classification information or laundry distribution information, thereby performing processing/determination and generating control signals.

The AI device 20 may be a client device which directly uses the results of AI processing or a cloud-environment device which provides the results of AI processing to other devices. The AI device 20 may be a computing device capable of learning neural networks and may be implemented as at least one of various electronic devices, such as servers, desktop PCs, laptop computers, or tablet PCs.

The AI device 20 may include an AI processor 21, a memory 25, and/or a communication device 27.

The AI processor 21 may learn a neural network based on the program stored in the memory 25. In particular, the AI processor 21 may learn a neural network for recognizing relevant data of the washer 10. The neural network for recognizing the relevant data of the washer 10 may be designed to mimic the human brain on the computer and may include a plurality of weighted network nodes which mimic the neurons of the human neural network. The plurality of network nodes may transmit and receive data in accordance with each connection relationship to simulate the synaptic activity of neurons in which neurons transmit and receive signals through synapses. Here, the neural network may include a deep learning model developed from a neural network model. In the deep learning model, a plurality of network nodes is positioned in different layers and may transmit and receive data in accordance with a convolution connection relationship. The neural network, for example, includes various deep learning techniques such as deep neural networks (DNN), convolutional deep neural networks (CNN), recurrent neural networks (RNN), a restricted boltzmann machine (RBM), deep belief networks (DBN), and a deep Q-network, and may be applied to fields such as computer vision, voice recognition, natural language processing, and voice/signal processing.

Meanwhile, a processor that performs the functions described above may be a general purpose processor (e.g., a CPU), but may be an AI-only processor (e.g., a GPU) for artificial intelligence learning.

The memory 25 may store various programs and data for the operation of the AI device 20. The memory 25 may be a nonvolatile memory, a volatile memory, a flash-memory, a hard disk drive (HDD), a solid state drive (SDD), or the like. The memory 25 is accessed by the AI processor 21 and reading-out/recording/correcting/deleting/updating, etc. Of data by the AI processor 21 may be performed. Further, the memory 25 may store a neural network model (e.g., a deep learning model 26) generated through a learning algorithm for data classification/recognition according to an embodiment of the present disclosure.

Meanwhile, the AI processor 21 may include a data learning unit 22 that learns a neural network for data classification/recognition. The data learning unit 22 may learn references about what learning data are used and how to classify and recognize data using the learning data in order to determine data classification/recognition. The data learning unit 22 may learn a deep learning model by acquiring learning data to be used for learning and by applying the acquired learning data to the deep learning model.

The data learning unit 22 may be manufactured in the type of at least one hardware chip and mounted on the AI device 20. For example, the data learning unit 22 may be manufactured in a hardware chip type only for artificial intelligence, and may be manufactured as a part of a general purpose processor (CPU) or a graphics processing unit (GPU) and mounted on the AI device 20. Further, the data learning unit 22 may be implemented as a software module. When the data leaning unit 22 is implemented as a software module (or a program module including instructions), the software module may be stored in non-transitory computer readable media that may be read through a computer. In this case, at least one software module may be provided by an OS (operating system) or may be provided by an application.

The data learning unit 22 may include a learning data acquiring unit 23 and a model learning unit 24.

The learning data acquiring unit 23 may acquire learning data required for a neural network model for classifying and recognizing data. For example, the learning data acquiring unit 23 may acquire, as learning data, vehicle data and/or sample data to be input to a neural network model.

The model learning unit 24 may perform learning such that a neural network model has a determination reference about how to classify predetermined data, using the acquired learning data. In this case, the model learning unit 24 may train a neural network model through supervised learning that uses at least some of learning data as a determination reference. Alternatively, the model learning data 24 may train a neural network model through unsupervised learning that finds out a determination reference by performing learning by itself using learning data without supervision. Further, the model learning unit 24 may train a neural network model through reinforcement learning using feedback about whether the result of situation determination according to learning is correct. Further, the model learning unit 24 may train a neural network model using a learning algorithm including error back-propagation or gradient decent.

When a neural network model is learned, the model learning unit 24 may store the learned neural network model in the memory. The model learning unit 24 may store the learned neural network model in the memory of a server connected with the AI device 20 through a wire or wireless network.

The data learning unit 22 may further include a learning data preprocessor (not shown) and a learning data selector (not shown) to improve the analysis result of a recognition model or reduce resources or time for generating a recognition model.

The learning data preprocessor may preprocess acquired data such that the acquired data may be used in learning for situation determination. For example, the learning data preprocessor may process acquired data in a predetermined format such that the model learning unit 24 may use learning data acquired for learning for image recognition.

Further, the learning data selector may select data for learning from the learning data acquired by the learning data acquiring unit 23 or the learning data preprocessed by the preprocessor. The selected learning data may be provided to the model learning unit 24. For example, the learning data selector may select only data for objects included in a specific area as learning data by detecting the specific area in an image acquired through a camera of a vehicle.

Further, the data learning unit 22 may further include a model estimator (not shown) to improve the analysis result of a neural network model.

The model estimator inputs estimation data to a neural network model, and when an analysis result output from the estimation data does not satisfy a predetermined reference, it may make the model learning unit 22 perform learning again. In this case, the estimation data may be data defined in advance for estimating a recognition model. For example, when the number or ratio of estimation data with an incorrect analysis result of the analysis result of a recognition model learned with respect to estimation data exceeds a predetermined threshold, the model estimator may estimate that a predetermined reference is not satisfied.

The communication unit 27 may transmit the AI processing result by the AI processor 21 to an external electronic device.

Here, the external electronic device may be defined as an autonomous vehicle. Further, the AI device 20 may be defined as another vehicle or a 5G network that communicates with the autonomous vehicle. Meanwhile, the AI device 20 may be implemented by being functionally embedded in an autonomous module included in a vehicle. Further, the 5G network may include a server or a module that performs control related to autonomous driving.

Figure 6:
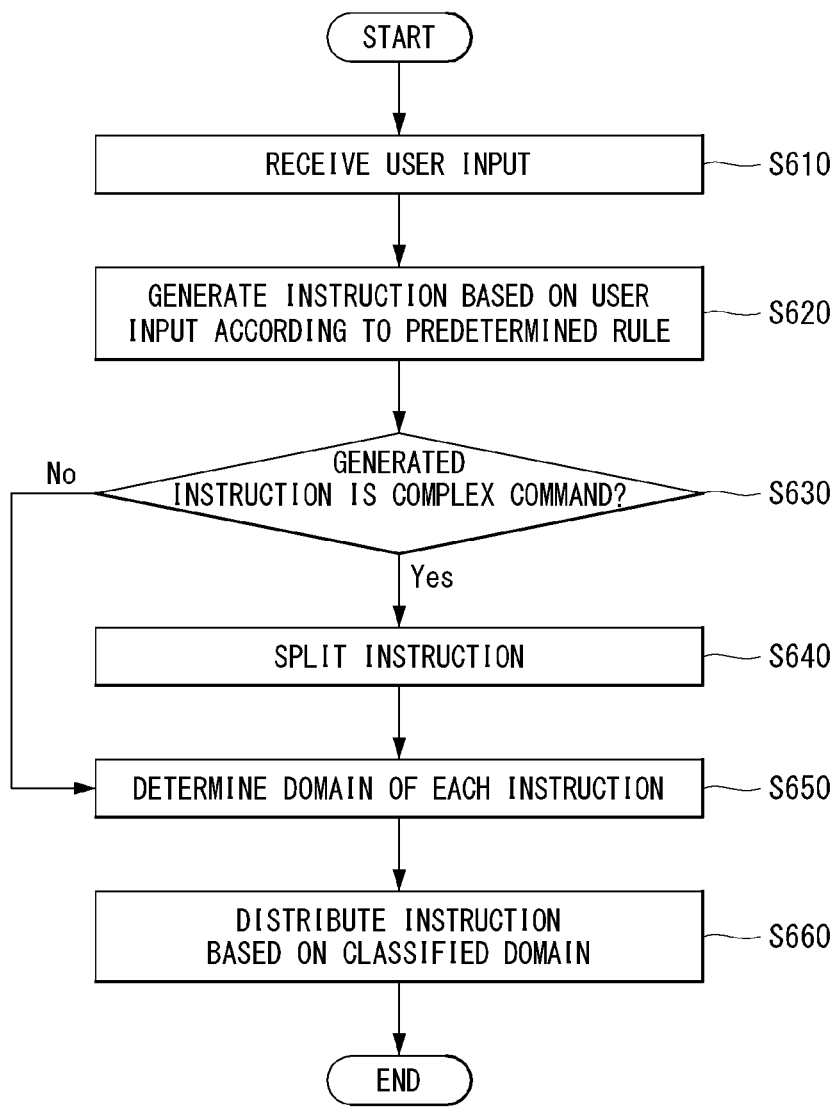
FIG. 6 is a flowchart illustrating a user command processing method of a voice assistant according to an embodiment of the present disclosure.

Meanwhile, the AI device 20 shown in FIG. 6 was functionally separately described into the AI processor 21, the memory 25, the communication unit 27, etc., but it should be noted that the aforementioned components may be integrated in one module and referred to as an AI module.

Figure 5:
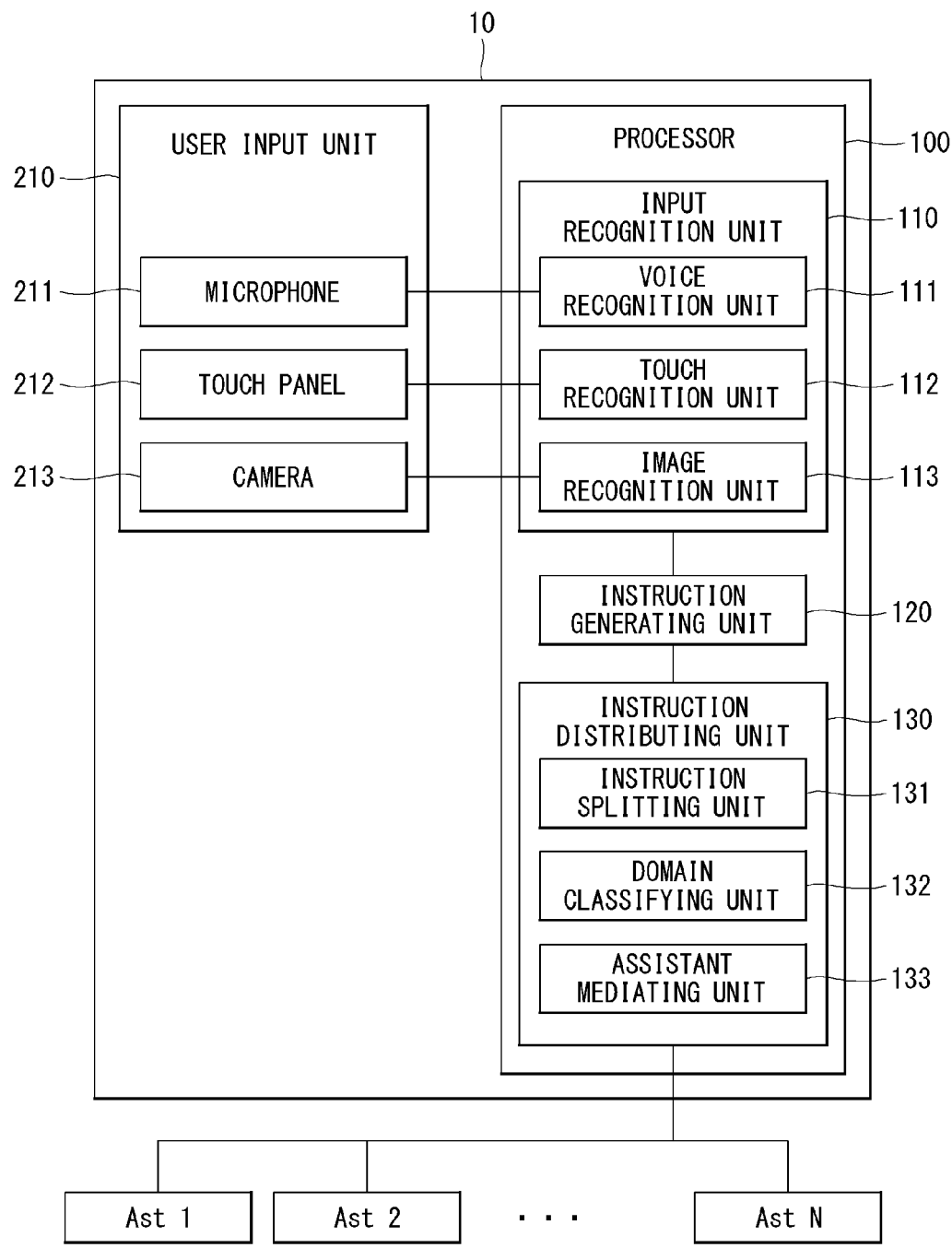
FIG. 5 is a diagram illustrating an assistant system according to an embodiment of the present disclosure.

FIG. 5 is a diagram illustrating an assistant system according to an embodiment of the present disclosure.

Referring to FIG. 5, an assistant system 10 according to an embodiment of the present disclosure may generate an instruction based on an integrated rule of a user command input through the user input unit 210 of various forms and process the generated instruction in the assistant system 10 itself or deliver the generated instruction to at least one assistant Ast 1 to Ast N. In addition, the assistant system 10 may distribute the instruction to two or more assistants Ast 1 to Ast N based on that the generated instruction is a complex instruction.

In addition, the assistant system 10 of the present disclosure may perform a specific service according to a user input provided through the user input unit 210. For example, the assistant system 10 may be mounted on a vehicle and control a navigation or audio device mounted in the vehicle according to voice recognition of an occupant. Assistants Ast 1 to Ast N may be connected to the assistant system 10 according to the present disclosure to perform a specific service based on voice recognition.

The assistant system 10 according to an embodiment of the present disclosure includes the user input unit 210 and a processor 100.

The user input unit 210 may include a microphone 211, a touch panel 212, a camera 213, and the like. The microphone 211 may receive a voice signal, and the touch panel 212 may be combined with a display panel to detect a touch input on the display panel. The camera 213 includes a 2D camera or a 3D camera.

The processor 100 includes an input recognition unit 110, an instruction generating unit 120, and an instruction distributing unit 130.

The input recognition unit 110 generates specific data based on a user input from the user input unit 210. The input recognition unit 110 may include a voice recognition unit 111, a touch recognition unit 112, and an image recognition unit 113. The voice recognition unit 111 converts a voice signal received through the microphone 211 into text. The touch recognition unit 112 detects a touch operation on the touch panel 212 and determines a touch area. The image recognition unit 113 may generate image data according to a predetermined resolution based on an image captured by the camera 213 and may check a user's motion based on an object detected from the image data.

The instruction generating unit 120 generates an instruction to be provided to an assistant based on the specific data generated by the input recognition unit 110. The instruction generating unit 120 generates an instruction based on a command received through the user input unit 210. The instruction is used to control the assistants Ast 1 to Ast N to perform a specific function and is generated based on a predetermined rule. The predetermined rule, which is for integrating information obtained through different user input units, may correspond to a programming language.

The instruction distributing unit 130 determines an assistant to which the instruction is to be delivered and delivers the instruction to a corresponding assistant according to characteristics of the instruction.

FIG. 6 is a flowchart illustrating a user command processing method of a voice assistant according to an embodiment of the present disclosure.

Referring to FIG. 6, in a first step S610 for the user command processing method of the voice assistant, the input recognition unit 110 processes a user input received through the user input unit 210.

In a second step (S620), the instruction generating unit 120 generates an instruction based on a user command according to a predetermined rule.

The predetermined rule is for expressing user commands from different types of user input units 210 in a unified form. Accordingly, the instruction generating unit 120 may convert user commands of various input types into an instruction of a unified form.

The instruction generating unit 120 extracts a user intent and attribute data from the user input including a voice signal. The user intent may include an object to be processed for the command and a processing method of the object. In addition, the user intent may include a device to be controlled.

The attribute data may include a category, an additional attribute, and the like.

In addition, the instruction generating unit 120 may generate an instruction by combining keywords of the user intent and the attribute data. For example, the instruction generating unit 120 may include {"user intent"; "attribute data"}.

Figure 7:
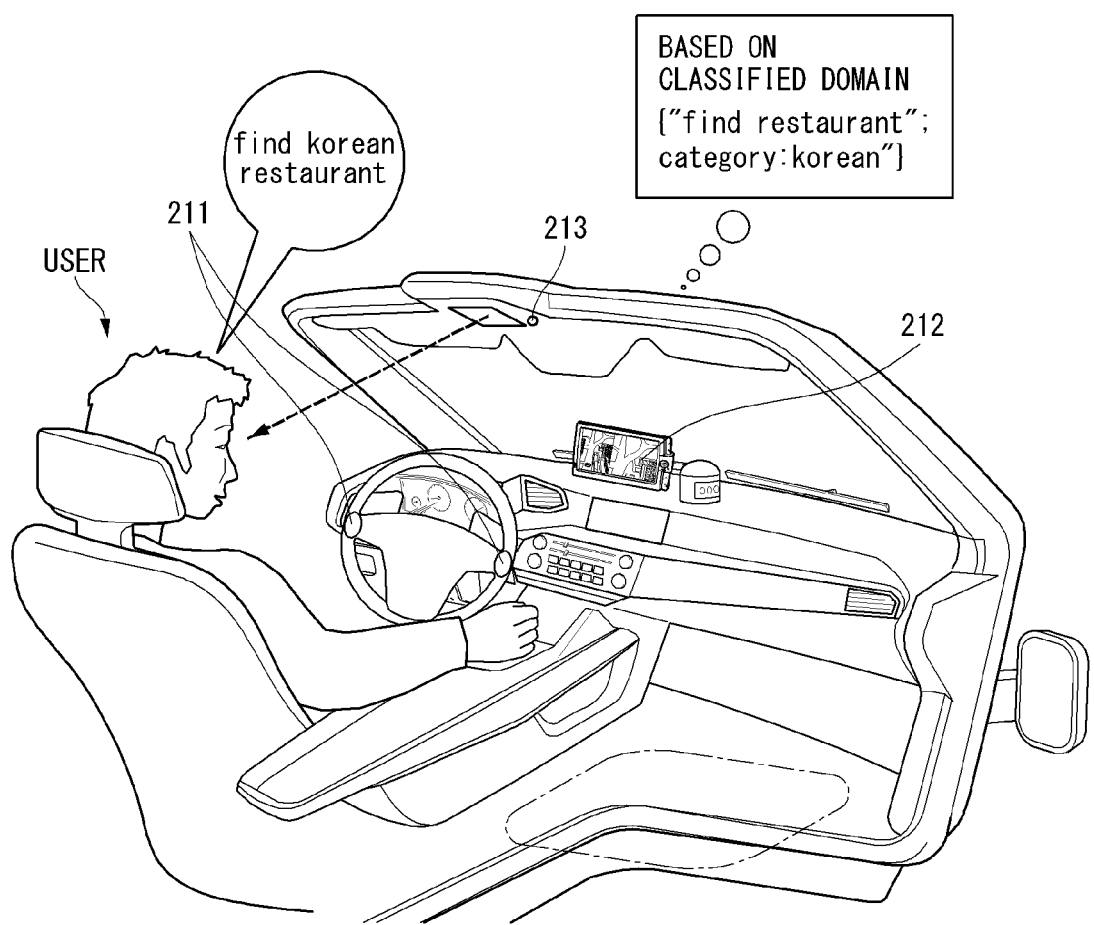
FIG. 7 is a view illustrating an example of generating a user input and an instruction.

FIG. 7 is a view illustrating an example of generating a user input and an instruction. Specifically, FIG. 7 illustrates an embodiment in which a voice assistant system is implemented in a vehicle.

Referring to FIG. 7, the input recognition unit 110 may simultaneously receive a user command from one user input unit 210 or different types of user input units 210. For example, when the user makes a voice command "find korean restaurant", the voice recognition unit 111 may recognize a voice signal received from the microphone 211.

Alternatively, if the user touches a specific area on a map of a navigation 212 implemented as a touch panel, while giving a voice command "go there", the voice recognition unit 111 may recognize "go there" and simultaneously obtain the area in which the touch was detected on the map of the navigation 212, as coordinates.

When the user command received by the voice recognition unit 111 is "Find j-korean restaurant", the instruction generating unit 120 may generate "find.restaurant" for a restaurant search as a user intent and generates attribute data as "category: korean".

As a result, the instruction generating unit 120 may generate an instruction of {"find.restaurant"; "category: korean"} based on the voice signal of "find korean restaurant".

In addition, when the user command received by the voice recognition unit 111 is "go there", the instruction generating unit 120 may extract "navi.go" for setting a destination of the navigation as the user intent and extract a point detected on the navigation 212 corresponding to the touch panel, as attribute data. Accordingly, the instruction generating unit 120 may generate an instruction of {"navi.go":"position: {"longitude:124.75","latitude:28.54"}"} based on map coordinates of "longitude:124.75","latitude:28.54" obtained by the touch recognition unit 112, together with the voice signal of "go there".

In a third step S630 and a fourth step S640, an instruction splitting unit 131 determines whether the generated instruction is a complex instruction. When it is determined that the instruction is a complex instruction, the instruction splitting unit 131 splits the instruction into partial instructions. The complex instruction refers to that instructions generated based on user inputs which are simultaneously input induce two or more events, and includes two or more user intents and two or more attribute data. The partial instruction induces one event and has a form of a combination of one user intent and one attribute data.

In a fifth step S650, the instruction distributing unit 130 determines a domain of each of the partial instructions. The domain is determined according to the user intent of the partial instructions and refers to an event field that the partial instructions request. For example, if the partial instruction is to search for a specific destination or to set a destination of the navigation, the domain may be determined as "Map" or "destination". Alternatively, if the partial instruction is to request weather, the domain may be determined as "weather".

In a sixth step S660, the instruction distributing unit 130 distributes the instructions to the assistants based on the domain of the partial instructions. That is, the instruction distributing unit 130 distributes the partial instructions to the assistants matched to the domain of the partial instructions.

Figure 8:
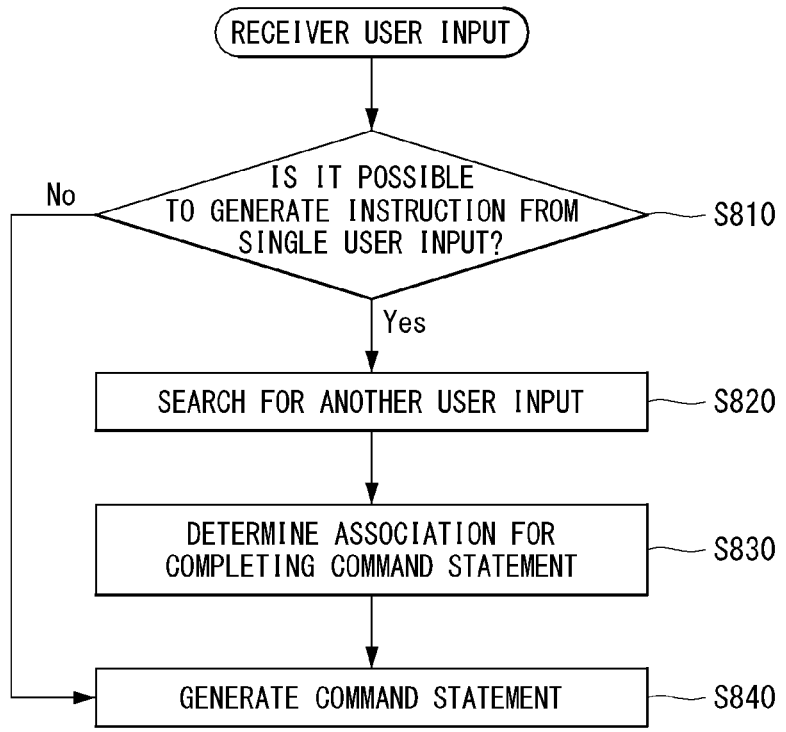
FIG. 8 is a flowchart illustrating a statement generating method according to an embodiment of the present disclosure.

FIG. 8 is a flowchart illustrating a statement generating method according to an embodiment of the present disclosure.

Referring to FIG. 8, in a first step S810 of generating a statement, the instruction generating unit 120 determines whether an instruction may be generated based on a user input from a single user input unit 210. In particular, the instruction generating unit 120 determines whether an instruction may be generated based on a voice signal recognized by the voice recognition unit 111. This is because, in case of another type of user input unit 210, a user input itself is previously patterned in a form to induce a specific event.

In order to determine whether an instruction may be generated based on the voice signal, the instruction generating unit 120 may convert the voice signal into text. For example, the instruction generating unit 120 may convert the voice signal "find korean restaurant" or the voice signal "go there" into text.

The instruction generating unit 120 then extracts a user intent and attribute data from the text. For example, the voice recognition unit 111 may extract the text "go there" based on the voice signal. In addition, the instruction generating unit 120 may determine the user intent through the text "go" but may determine that it is impossible to extract attribute data from the adverb "there".

In a second step S820, the instruction generating unit 120 searches for another user recognizing unit based on impossibility of generating an instruction with the user input recognized by the one type of input recognizing unit 110. The instruction generating unit 120 may search for another type of user recognition unit 110 based on that a user intent or attribute data is missing or incomplete in the text.

For example, the instruction generating unit 120 may determine whether there is a user input received by the touch recognition unit 112 or the image recognition unit 113 based on the determination of the missing information indicating that the attribute data is missing in the text "go there".

In a third step S830, the instruction generating unit 120 determines whether there is an association between the other type of user input received together with the voice signal.

For example, the instruction generating unit 120 may detect a touch recognition on a navigation map implemented as a touch panel together with the voice signal "go there". When the instruction generating unit 120 determines that map coordinates recognized by the touch recognition unit 112 and an adverb related to a position "there" in the text of "go there" are related to each other, the instruction generating unit 120 may set the map coordinates generated by the touch recognition unit 112, as attribute data of "go there".

In a fourth step S840, the instruction generating unit 120 may generate an instruction based on another type of user input associated with the missing information of the text.

Figure 9:
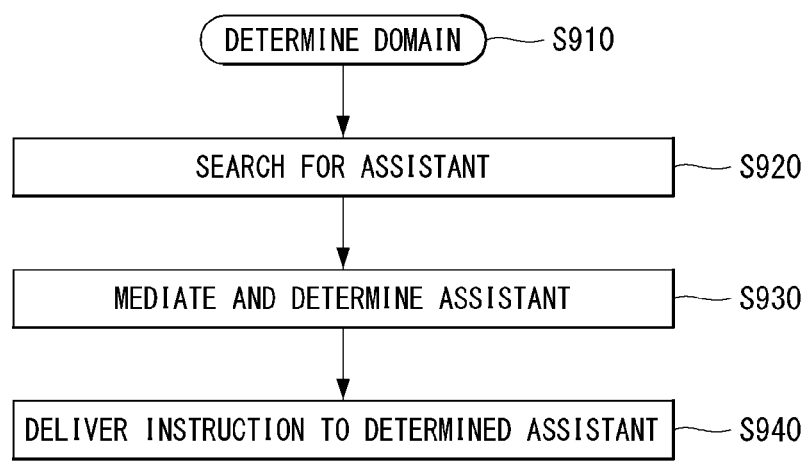
FIG. 9 is a flowchart illustrating an assistant mediating method according to an embodiment of the present disclosure.

FIG. 9 is a flowchart illustrating an assistant mediating method according to an embodiment of the present disclosure.

In a first step S910, a domain classifying unit 132 determines a domain of each of the partial instructions. The first step S910 corresponds to the procedure of S650 shown in FIG. 6. That is, the instruction distributing unit may additionally perform the following assistant mediation after determining the domains of the instructions.

In a second step S920, an assistant mediating unit 133 searches for assistants matched to the domains. Table 1 below shows assistants matched to domains and weights thereof.

TABLE 1

| Domain | Ast 1 | Ast 2 | Ast 3 |
|---|---|---|---|
| Destination | 0.9 | 0 | 0 |
| Map | 0.8 | 0 | 0 |
| ... | ... | ... | ... |
| Weather | 0 | 0.9 | 0.8 |
| News | 0 | 0.5 | 0.7 |
| Stock | 0 | 0.7 | 0.6 |

The weights may be identified by zero or a number exceeding zero. A weight of zero in a particular assistant indicates that the corresponding assistant does not handle the corresponding domain. For example, it indicates that second and third assistants Ast 2 and Ast 3 do not respond to an event related to "Destination" and "Map". That is, searching of an assistant matched to a domain refers to searching for an assistant having a magnitude of a weight greater than zero for the corresponding domain.

In a third step S930, the assistant mediating unit 133 mediates the determined domain.

Domains such as "Weather", "News" and "Stock" are matched to the second and third assistants Ast 2 and Ast 3. In this manner, when a plurality of assistants are matched to one domain, the assistant mediating unit 133 mediates the assistants to determine one assistant.

To this end, the assistant mediating unit 133 may compare the magnitudes of the weights and select an assistant having a larger magnitude.

The magnitude of the weight is proportional to reliability or performance. For example, for "News", reliability or performance of the third assistant Ast 3 having a weight of 0.7 is superior to that of the second assistant Ast 2 having a weight of 0.5. Accordingly, the assistant mediating unit 133 may match the third assistant Ast 3 to the domain of "News".

Similarly, the assistant mediating unit 133 may match the second assistant Ast 2 to the domain of "Weather".

If the complex instruction includes first and second partial instructions and a domain of the first partial instruction is "Weather" and a domain of the second partial instruction is "News", the complex instruction may be processed in different assistants as described above. Alternatively, in consideration of the sum of weights, the first and second partial instructions may be matched to one assistant. For example, since the sum of the weights for the domains of "Weather" and "News" of the third assistant Ast 3 is larger, both the domains of the first and second partial instructions may be matched to the third assistant Ast 3.

In addition, the assistant mediating unit 133 may match the domains and the assistants in consideration of a frequency of use of the assistants. Table 2 below shows the frequency of use of the assistants according to the domains.

TABLE 2

| Domain | Ast 1 | Ast 2 | Ast 3 |
|---|---|---|---|
| Destination | 11 | 0 | 0 |
| Map | 11 | 0 | 0 |
| ... | ... | ... | ... |
| Weather | 0 | 15 | 16 |
| News | 0 | 20 | 9 |
| Stock | 0 | 10 | 6 |

The domains such as "Weather", "News" and "Stock" are matched to the second and third assistants Ast 3. As described above, when a plurality of assistants are matched to one domain, the assistant mediating unit 133 mediates the assistants to determine one assistant.

To this end, the assistant mediating unit 133 may select an assistant with a high frequency of use. For example, the assistant mediating unit 133 may match the second assistant Ast 2 to the domain of "News". Similarly, the assistant mediating unit 133 may match the third assistant Ast 3 to the domain of "Weather".

In consideration of the sum of the frequencies of use, the first and second partial instructions may be matched to one assistant. For example, since the sum of the frequencies of use of the domains for "Weather" and "News" of the second assistant Ast 2 is larger, both the domains of the first and second partial instructions may be matched to the second assistant Ast 2.

In a fourth step S940, the instruction distributing unit 130 delivers the instruction to the assistant determined by the assistant mediating unit 133.

Figure 10:
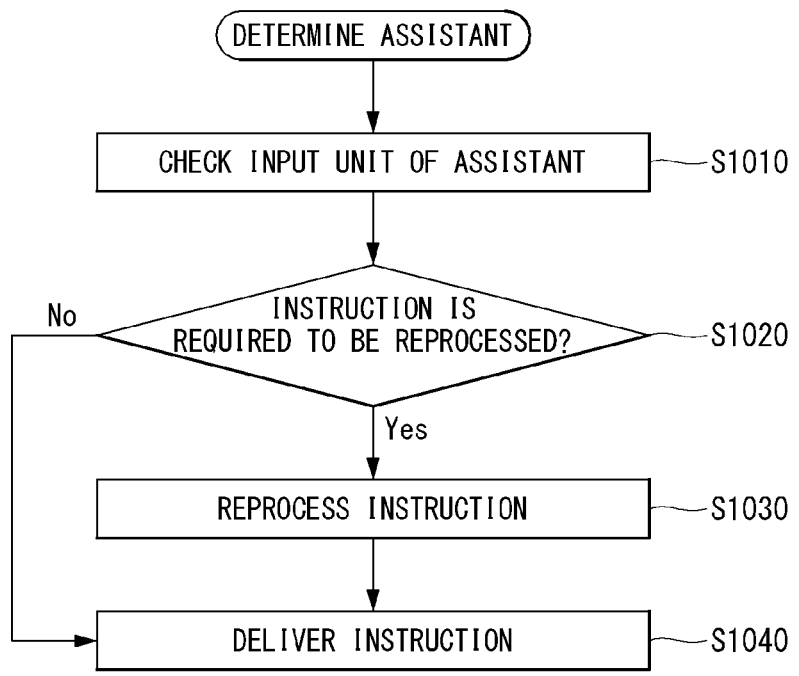
FIG. 10 is a flowchart illustrating a procedure of instruction reprocessing.

FIG. 10 is a flowchart illustrating a procedure of instruction reprocessing. Specifically, FIG. 10 corresponds to a follow-up procedure after determining an assistant for partial instructions in the third step S930 of FIG. 9.

Referring to FIG. 10, in a first step S1010 and a second step S1020 for instruction reprocessing, the instruction distributing unit 130 determines whether instruction reprocessing is required based on checking of an input unit of an assistant to which partial instructions are to be delivered.

For example, if the assistant is embedded together with the processor 100, the partial instructions generated by the processor 100 may be delivered as it is. Or, if the assistant is an external assistant operating based on a voice signal, it must be delivered as the voice signal. As such, whether to reprocess the instruction may be determined according to whether the input unit of the assistant is based on the same text as the instruction or any other.

In a third step S1030, when the input unit of the assistant to which the partial instructions are to be delivered is a voice signal, the instruction distributing unit 130 converts the partial instructions into a voice signal. The instruction distributing unit 130 may convert the text-based instructions into voice signals using text to speech (TTS).

Figure 11:
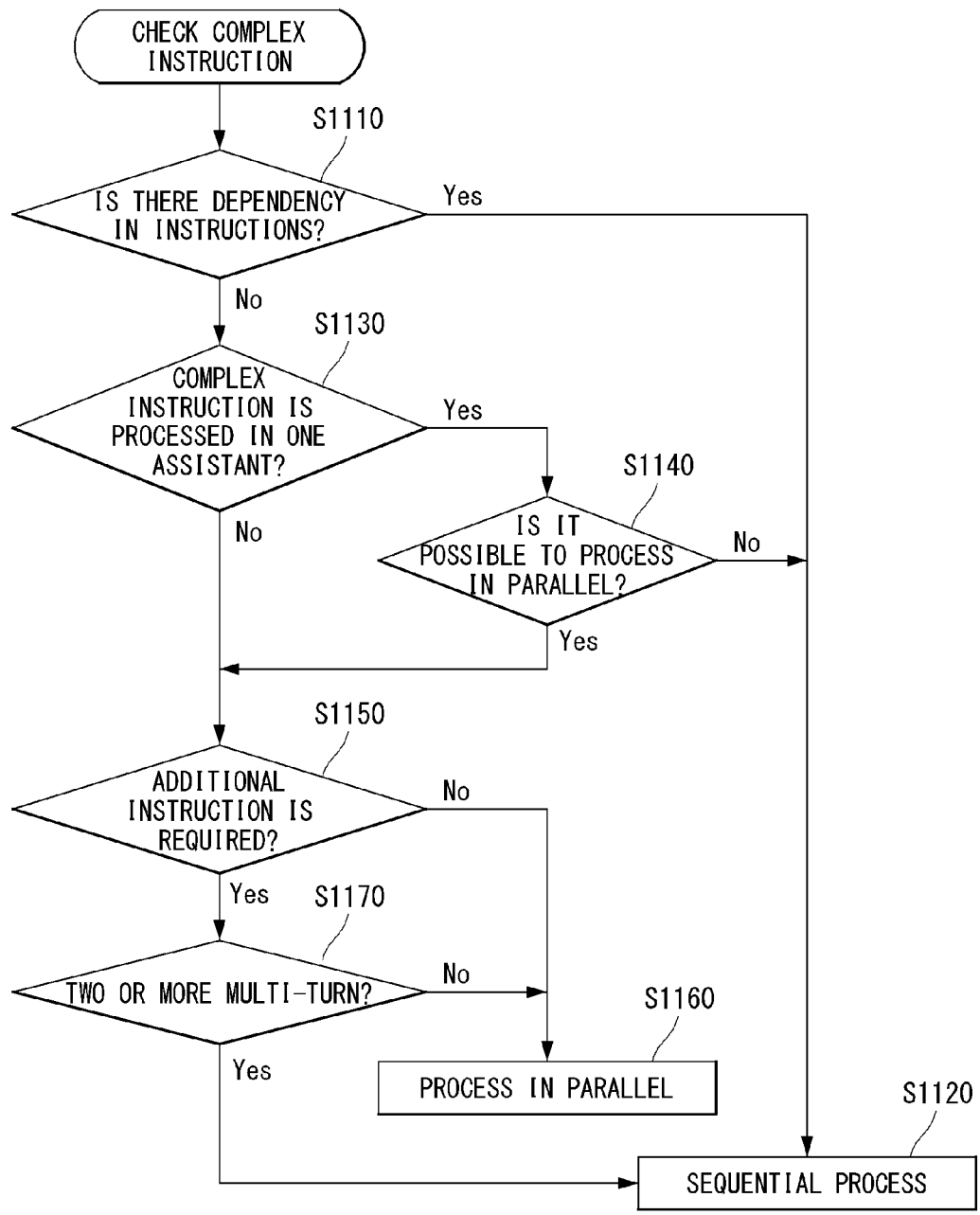
FIG. 11 is a diagram illustrating a processing sequence of a complex instruction according to an embodiment of the present disclosure.

FIG. 11 is a diagram illustrating a processing sequence of a complex instruction according to an embodiment of the present disclosure. The procedures shown in FIG. 11 may be performed in the instruction distributing unit.

Referring to FIG. 11, when a complex instruction is checked, it is determined whether dependency exists in the partial instructions in a first step S1110. The instruction distributing unit 130 may determine that there is dependency between the partial instructions based on the need for a temporal order for event processing of the partial instructions. For example, in order to process a user input of "find nearest korean restaurant and call there", an assistant may process the event for "find nearest korean restaurant" and then process the event for "call there". As such, when there is a designator designating a part of another partial instruction in a partial instruction, the instruction distributing unit 130 may determine that the partial instructions of the corresponding complex instruction have dependency.

Alternatively, a user input of "find nearest korean restaurant and set fan speed to 4" may be split into partial instructions for performing "find nearest korean restaurant" and "set fan speed to 4", and the partial instructions may be processed independently of each other. When temporal order is not necessary in the process of processing the partial instructions as described above, the instruction distributing unit 130 determines that the respective partial instructions are not dependent.

In a second step S1120, the instruction distributing unit 130 sequentially processes the complex instructions based on the existence of dependencies between the partial instructions.

In a third step S1130, the instruction distributing unit 130 checks the number of assistants in which the partial instructions are processed based on the absence of dependency between the partial instructions.

In a fourth step S1140, the instruction distributing unit 130 determines whether the partial instructions can be parallel-processed based on the partial instructions processed in one assistant. In addition, the instruction distributing unit 130 sequentially processes the partial instructions based on that the partial instructions cannot be processed in parallel (S1020). For example, if the user input is a voice signal of "call james and call sarah", there is a restriction that one voice assistant who makes a call cannot make a call to two persons. As such, if the parallel processing is not supported or if the parallel processing is not performed due to specificity of a user intent, the instruction distributing unit 130 sequentially processes the respective partial instructions.

In a fifth step S1150, the instruction distributing unit 130 determines whether additional instructions are required based on whether partial instructions are processed in two or more assistants or processed in parallel in one assistant. The additional instruction refers to a form in which a specific event cannot be generated due to an incomplete user input which is primarily input. In other words, the additional instruction refer to missing a user intent or attribute data in an instruction. For example, a user input of "set fan speed" includes a user intent to adjust a speed of a fan but is missing attribute data on how much speed is required. If the attribute data cannot be searched through another user input unit 210, the instruction distributing unit 130 should request the user to input the attribute data for the speed of the fan.

In a sixth step S1160, the instruction distributing unit 130 processes the partial instructions in parallel based on that an additional instruction is not required.

In a seventh step S1170, the instruction distributing unit 130 checks the number of additional instructions based on the need for the additional instructions.

The instruction distributing unit 130 sequentially processes the partial instructions based on the need for two or more additional instructions (S1020).

In addition, the instruction distributing unit 130 processes the partial instructions in parallel based on that only one additional instruction is required (S1060).

Figure 12:
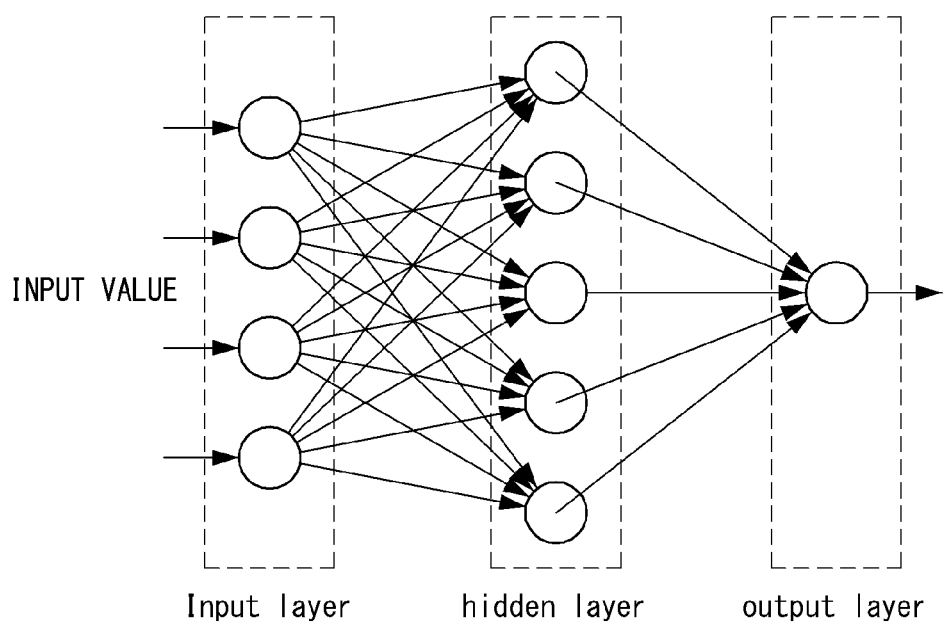
FIG. 12 is a view illustrating an assistant determination model for artificial intelligence learning according to an embodiment of the present disclosure.

FIG. 12 is a diagram illustrating an assistant determination model for artificial intelligence (AI) learning according to an embodiment of the present disclosure.

Referring to FIG. 12, the processor 100 may generate an instruction from a user input and determine an assistant based on an assistant determination model.

The assistant determination model performs AI learning to derive a specific output value according to input values. The input values correspond to a user input and a domain of an assistant. The output value may include an instruction, assistant information, and the like. The instruction may include a text-based instruction or a voice instruction obtained by converting a command into a voice signal. The assistant information may correspond to an ID of an assistant to which the instruction is to be delivered.

The above-described invention may be implemented in computer-readable code in program-recorded media. The computer-readable media include all types of recording devices storing data readable by a computer system. Example computer-readable media may include hard disk drives (HDDs), solid state disks (SSDs), silicon disk drives (SDDs), ROMs, RAMs, CD-ROMs, magnetic tapes, floppy disks, and/or optical data storage, and may be implemented in carrier waveforms (e.g., transmissions over the Internet). The foregoing detailed description should not be interpreted not as limiting but as exemplary in all aspects. The scope of the present disclosure should be defined by reasonable interpretation of the appended claims and all equivalents and changes thereto should fall within the scope of the invention.

The foregoing features, structures, or effects are included in, but not limited to, at least one embodiment of the present disclosure. The features, structures, or effects exemplified in each embodiment may be combined or modified by one of ordinary skill in the art in other embodiments. Thus, such combinations or modifications should be interpreted as belonging to the scope of the present disclosure.

While the present disclosure has been shown and described with reference to embodiments thereof, it will be apparent to those of ordinary skill in the art that various changes in form and detail may be made thereto without departing from the spirit and scope of the present disclosure as defined by the following claims. For example, each component in the embodiments may be modified. Such modifications and applications should be construed as included in the scope of the present disclosure as defined by the appended claims.

What is claimed is:

1. A method of processing a user input to deliver the user input to at least one of a plurality of assistant computing devices connected to an assistant system, the method comprising:
   receiving, using a user input device of the assistant system, a user input including a voice signal;
   generating, using the assistant system, an instruction by converting the user input including the voice signal based on a predetermined rule;
   based on the generated instruction being a complex instruction that requests two or more events, splitting, using the assistant system, the complex instruction into partial instructions; and
   determining, using the assistant system, a domain of each of the partial instructions and distributing, using the assistant system and based on the domain, the partial instructions to at least one of the plurality of assistant computing devices connected to the assistant system,
   wherein distributing the partial instructions comprises:
      determining, using the assistant system, whether the partial instructions have dependency to be treated in time series based on presence of an indicator indicating a user intent or attribute data of other partial instructions among the partial instructions,
      determining, using the assistant system and based on a determination that the partial instructions do not have dependency to be treated in time series, a number of assistant computing devices for processing the partial instructions in parallel, and
      based on a determination that the partial instructions have dependency to be treated in time series, sequentially processing, using the assistant system, the partial instructions for a single assistant computing device configured to process the partial instructions sequentially in time,
   wherein distributing the partial instructions further comprises:
      determining whether an additional instruction is required based on the partial instructions being processed in two or more assistants or processed in one assistant in parallel,
      parallel-processing the partial instructions based on the additional instruction being not required, and
      sequentially processing the partial instructions based on two or more additional instructions being required.

2. The method of claim 1, wherein generating the instruction comprises:
   extracting a user intent and attribute data from the user input; and
   combining the user intent to the attribute data.

3. The method of claim 2, wherein extracting the user intent comprises:
   extracting at least one of a target to be treated as a command and a processing method of the target from the user's input.

4. The method of claim 3, wherein extracting the attribute data comprises:
   extracting at least one of a category of the target and an additional attribute.

5. The method of claim 2, wherein generating the instruction comprises:
   converting the voice signal into text;
   determining whether there is omitted information among the user intent and the attribute data in the text, and searching for a different type user input other than the voice signal based on the determination of the omitted information; and
   completing the instruction based on a user's input associated with the omitted information in the different type user input.

6. The method of claim 2, wherein splitting the complex instruction into partial instructions comprises generating the partial instructions by matching associated user intent and attribute data.

7. The method of claim 2, wherein distributing the partial instructions comprises classifying the domain based on the user intent of the partial instructions and searching for an assistant matched to the domain among the assistants.

8. The method of claim 7, wherein searching the assistant matched to the domain comprises searching for an assistant having a highest weight given based on reliability or performance of the domain among a plurality of assistants based on the plurality of assistants matching the domain.

9. The method of claim 8, wherein searching the assistant matched to the domain comprises:
   adding weights of respective domains of the partial instructions; and determining an assistant having the largest sum of the weights as a common assistant of the domain of the partial instructions.

10. The method of claim 7, wherein searching the assistant matched to the domain comprises searching an assistant having a highest frequency use.

11. The method of claim 1, wherein distributing the partial instructions further comprises sequentially processing the complex instruction based on the partial instructions having the dependency.

12. The method of claim 1, wherein distributing the partial instructions further comprises parallel-processing the partial instructions based on only one additional instruction being required.

13. The method of claim 1, wherein distributing the partial instructions comprises:
   determining an input unit of the assistant to which the partial instructions are delivered; and
   converting the partial instructions into a voice command based on the input unit of the assistant being a voice signal.

* * * * *